May 8, 1945. K. BENDER 2,375,462
COMPRESSION RESISTANT GROUP OF FLAT LINK CHAINS
Filed Sept. 29, 1941 2 Sheets-Sheet 1
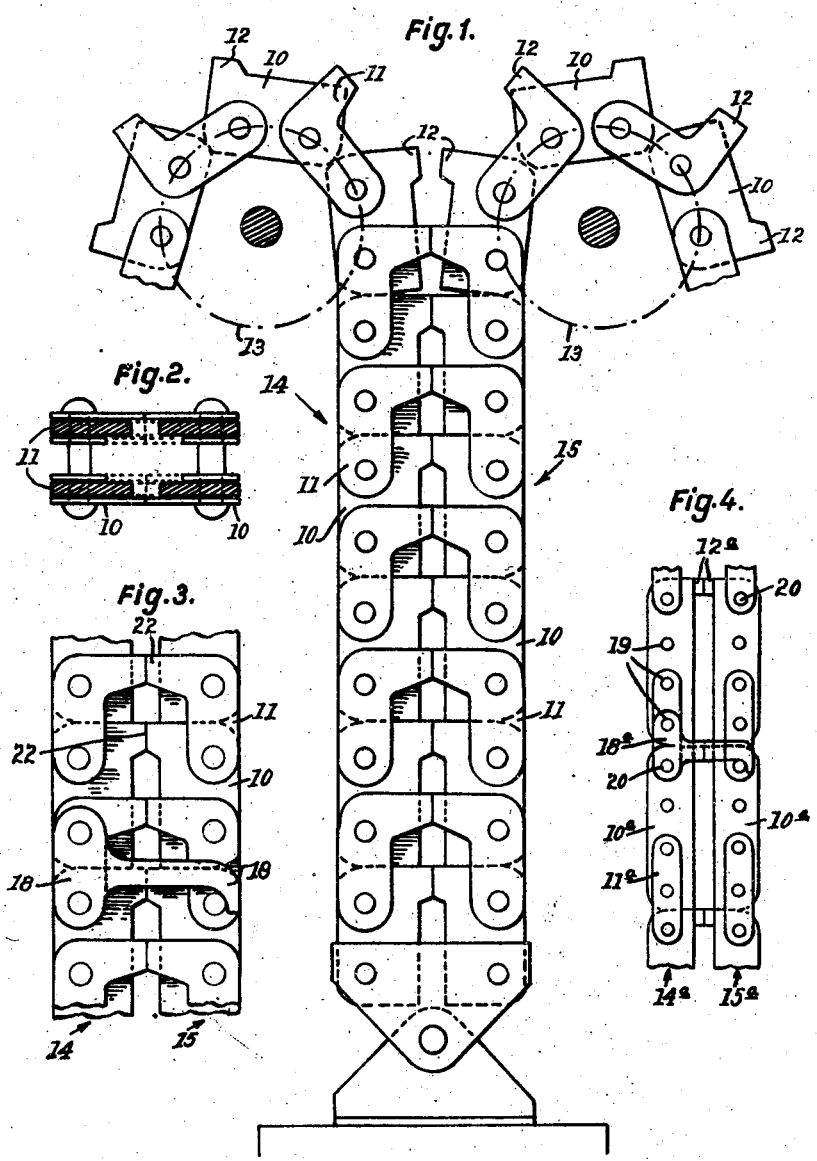

May 8, 1945. K. BENDER 2,375,462
COMPRESSION RESISTANT GROUP OF FLAT LINK CHAINS
Filed Sept. 29, 1941 2 Sheets-Sheet 2

Inventor:
Karl Bender
By: Mason & Porter
Attorneys

Patented May 8, 1945

2,375,462

UNITED STATES PATENT OFFICE 2,375,462

COMPRESSION RESISTANT GROUP OF FLAT LINK CHAINS

Karl Bender, Wurzburg, Germany; vested in the Alien Property Custodian

Application September 29, 1941, Serial No. 412,905
In Germany February 4, 1938

13 Claims. (Cl. 189—34)

The present invention relates to a compression resistant group of flat link chains which is suitable in all cases in which loads are to be lifted and/or to be pressed downwardly. The invention is particularly adapted for use in connection with lifting gears of sluices, flood or lifting gates, mitred lock gates, and the like.

The group of flat chains consists of two oppositely acting flat link chains, adapted to be wound up in the same plane, and to bear against each other for the purpose of forming a compression resistant group of flat link chains.

Each individual flat link chain consists of links pivotally connected to each other. The portions of the links located above the upper pivot pin are provided with nose-like projections facing the cooperating chain, and these projections are so arranged that the edges of the noses of the one chain bear against the edges of the noses provided on the cooperating chain so that in this manner a mutual support of the two chains is obtained.

Moreover, individual links of the flat link chains may be provided with hook-shaped members which serve the purpose of locking and act upon pivot pins of the opposite or cooperating chain.

The arrangement may also be such that two such hooks engaging each other are provided in staggered relation on the two flat link chains. These pairs of short locking hooks are provided in spaced relation from each other. With this construction, groups of flat link chains are provided which, even when composed of relatively short links, offer a very great resistance to compression.

Each individual link of each chain need not necessarily be provided with a nose-like projection, and in some cases a nose at each second or third link only is sufficient. In connection with flat link chains having locking hooks in addition, a still smaller number of noses may be sufficient.

If each flat link of each chain is not provided with a nose, the links not having noses preferably are constructed as connecting links, and are for instance relatively short and small plates, whereas the links carrying noses and connected to each other by the connecting links are relatively long and fitted with driving pins. The connecting links may then be connected to the upper link member by two driving pins so that the connecting link cannot move relative to the upper link member.

The construction of the noses carried by the links of the flat link chains may be effected in various ways. Thus for instance, the noses may be integral with webs rigidly connected with the chain links.

It may be of advantage to provide the noses as plates or like elements fixed upon the upper portions of the chain links. In case of a chain consisting of links provided with connecting plates or the like, these noses extend as far as the connecting plate or links. By using such fixed noses in the form of U-shaped members having legs which embrace the centre links and extend as far as the connecting links, the latter bear against the legs of the noses as soon as chains occupy a stretched position and, therefore, said links cannot move further in a direction toward the opposed chain. A mutual displacement of the individual center or middle flat links, therefore, is counteracted.

Preferably, at the lower ends of the middle or intermediate links, stop blocks are additionally provided which are so constructed that the upper portions of the middle links bear against these stop blocks as soon as the flat link chains occupy the stretched position. By this construction a mutual displacement of the middle links is absolutely prevented, and, moreover, the advantage is ensured that after leaving the sprocket wheels, the flat link chains are positively brought into a perfectly stretched position between the sprocket wheels and the object or member to be moved.

In the accompanying drawings some modifications of groups of flat link chains constructed in accordance with the invention are shown by way of example.

In these drawings:

Fig. 1 is a side elevation of a group of flat link chains,

Fig. 2 is a cross section through the group of link chains according to Fig. 1,

Figure 5:
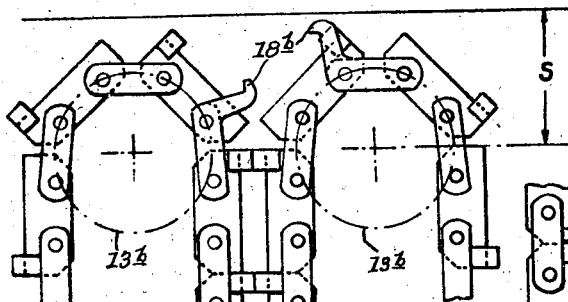
Figure 6:
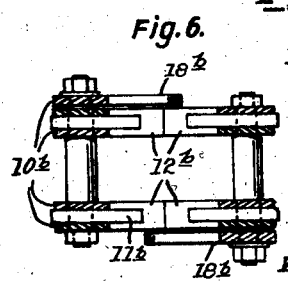
Figure 7:
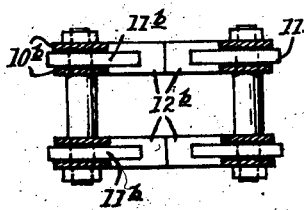
Figure 8:
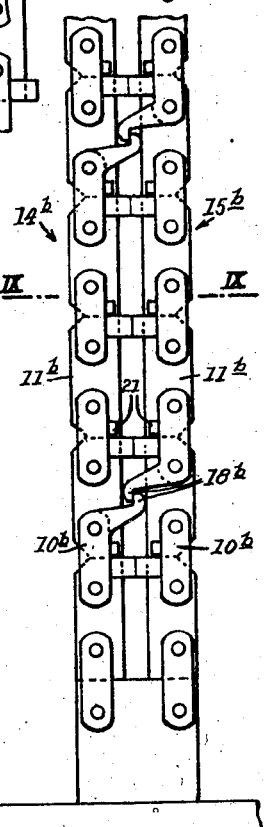
Figure 9:
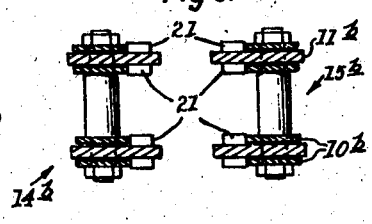

Fig. 3 shows a side elevation of a modified construction of a group of flat link chains provided with locking hooks, Fig. 4 is a side elevation of another modification provided with long chain links and connecting links, Fig. 5 shows a side elevation of a group of flat link chains carrying pushed on noses and pairs of hooks, Fig. 6 is a section on line VI—VI of Fig. 5, Fig. 7 is a section on line VII—VII of Fig. 5, Fig. 8 is a side elevation of a group of flat link chains having additional cams, and Fig. 9 is a section on line IX—IX through the group of flat link chains according to Fig. 8.

The two flat link chains of the several embodiments shown herein are so constructed as to act oppositely under compressive strain and to be unable to bend or flex in a direction away from each other.

In the two embodiments shown in Figs. 1 through 4, the ends of the chain links 10 and 11, and 10a and 11a, respectively, located above the uppermost pivot pins are provided with noses 12 and 12a, respectively.

These noses project beyond the inner edges of the middle links 10 or 10a far enough so that after leaving the driving wheels 13, they contact each other in the central plane of the two flat link chains 14 and 15 or 14a and 15a, without any clamping actions being possible during movement of the flat link chains over the wheels 13. The provision of nose-like projections on the chain links has the effect that the two flat link chains mutually support each other, so that a further intermediate member, for instance a special bearing chain, is not required.

If the flat link chains are loaded in compression they act in opposition to each other in such a manner as to be safe against bulging in any direction.

To increase the breaking strength of the chains at greater lengths, locking hooks 18, as shown in Figure 3, may be provided spaced in definite relation from each other.

The two flat link chains 14a and 15a are provided in the embodiment shown in Fig. 4, with the elongated links 11a and the middle links 10a are provided with riveted driving pins 19 and with a pivot pin 20. The outer or connecting links 11a are fixed to the middle links 10a by the driving pins 19 and extend for half the pitch of the chain beyond the lower end of the middle link 10a and engage the pivot pin 20 of the following middle link.

In this construction, only the upper portions of the middle links 10a, located above the pivot point 20 are provided with noses 12a.

Instead of these noses 12a, flat iron webs of the same thickness and width may be welded to the portions which connect the two middle links of a flat link chain. The result of the use of the flat iron webs is that, in the event of displacements of the two flat link chains in the directions of the axis of the chain pins, a safe bearing of the individual oppositely arranged pairs of middle links against each other is ensured on compressive loading of the chains. In connection with this construction also, more particularly at larger breaking lengths of the chains, locking hooks 18 may be provided at definite spaced distances from each other.

As shown in Figs. 5 through 8 U shaped noses 12b for each link are fixed upon the two members of the centre or middle links 10b on both chains at points above the respective upper pivot pins, in such a manner that the bodies of the noses 12b extend beyond the middle links 10b. They may be riveted, screwed, or welded to the middle links. The legs of the noses 12b extend over the middle links 10 as far as to the connecting links 11b so that, when the flat link chains are stretched, the links 11b bear against the legs of the noses 12b.

At definitely spaced distances from each other, locking hooks 18b are provided. The latter may be fixed to one of the flat link chains and be so constructed that they engage with an elongated chain pin of the oppositely arranged chain as soon as the flat link chains are stretched.

However, to maintain the distances from the centre of the driving wheel 13b to the outermost edge of the locking hook as small as possible during winding off of the chain from the driving wheel and consequently to utilize the space above the lifting gear as much as possible, preferably short locking hooks are provided, as shown in Figures 5 and 8, on both flat link chains which, when the latter are stretched, engage each other and lock the chains against moving away from each other or bulging.

To prevent jamming occurring during locking and to ensure a locking free of objection, the hooks 18b are staggered, that is, a right hand hook in Fig. 5 is located on a higher level than the interengaging left hand hook.

Besides the noses serving bearing purposes and provided at the upper ends of the middle links 10b and the locking hooks provided on the connecting links 11b, stop blocks 21 may, as shown in Figs. 8 and 9, be provided on the middle links 10b of both flat link chains at a point below the lower pivot pin. These stop blocks 21 are fixed at one or both sides of the middle links, for instance by riveting, screwing, or welding. The position of the stop blocks and the shape of the latter must be so chosen that when the flat link chains are stretched, one side of a stop block strongly bears against the inner edge of the related connecting link 11b. Preferably each link of the chains is provided with such a stop block which, of course, may consist of several parts.

I claim:

1. A compression resistant chain group comprising a pair of oppositely acting chains arranged to be wound up in the same plane, each chain comprising a plurality of links, pivots connecting adjacent links together, inwardly projecting noses formed on some of the links of both chains, said noses being located on the links at a point above the upper pivots thereof and being arranged to engage while the chains are in a stretched condition, whereby relative movement of the chains toward each other is prevented.

2. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented.

3. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, each of said chains comprising relatively long middle links on which said noses are located and connecting links devoid of noses and positioned on opposite sides of the middle links.

4. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, each of said chains comprising relatively long middle links in which the noses are located, connecting links devoid of noses, and at least two driving pins on said middle links and fixing said connecting links to the middle links.

5. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, said noses consisting of webs fixed to the links and projecting substantially in the plane of the corresponding links.

6. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engaged while the chains are in a stretched condition, whereby relative movement of the chains toward each other is prevented, said noses consisting of elements fixed on the upper ends of the corresponding links.

7. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, said noses consisting of elements fixed on the upper ends of the corresponding links and projecting inwardly as far as the opposed link.

8. A compression resistant chain group comprising a pair of oppositely acting chains arranged to be wound up in the same plane, each chain comprising a plurality of links, pivots connecting adjacent links together, inwardly projecting noses formed on some of the links of both chains, said noses being located on the links at a point above the upper pivots thereof and being arranged to engage while the chains are in a stretched condition, whereby relative movement of the chains toward each other is prevented, one of said chains comprising hook-shaped members spaced therealong and arranged to engage the other chain in a manner to prevent relative movement of the chains away from each other.

9. A compression resistant chain group comprising a pair of oppositely acting chains arranged to be wound up in the same plane, each chain comprising a plurality of links, pivots connecting adjacent links together, inwardly projecting noses formed on some of the links of both chains, said noses being located on the links at a point above the upper pivots thereof and being arranged to engage while the chains are in a stretched condition, whereby relative movement of the chains toward each other is prevented, said chains comprising locking hooks arranged to interengage between the chains and prevent relative outward movement of the chains.

10. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, and pairs of locking hooks on the chains, one hook of the pair being connected to a link of one chain and the other hook of the pair being connected to a link of the other chain, the links to which said hooks are connected being staggered with respect to each other along the chains, when chains are in stretched condition.

11. A compression resistant chain group comprising a pair of oppositely acting chains arranged to be wound up in the same plane, each chain comprising a plurality of links having flat sides, pivots connecting adjacent links together with their flat sides in bearing relation, inwardly projecting noses formed on a plurality of the links of both chains, said noses being located on the links above the upper pivots thereof and being arranged to engage while the chains are in a stretched condition, whereby relative movement of the chains toward each other is prevented, a stop block formed on one of the links at a point below the lower pivot of such link, the stop block being arranged to engage the edge of the next lower link when the chains are in stretched condition so as to prevent relative buckling of such link and the next lower link.

12. A compression resistant chain group according to claim 11 wherein the chains comprise alternate relatively long middle links and shorter connecting links arranged at the sides of the middle links, with the noses and the stop blocks mounted on the middle links.

13. A compression resistant chain group of the character described, comprising two oppositely acting chains adapted to be wound up in the same plane, each chain comprising alternate links of two types pivotally connected together, the first type of links having noses arranged to engage against the noses on the same type of link on the other chain, the second type of links being pivotally connected between the links of the first type, at least one of the second type links on one of the chains having a locking hook at its upper end, and at least one of the second type links of the other chain having a locking hook on its lower end, the locking hooks being located in staggered relation along the two chains and arranged to interengage while the chains are in stretched condition and prevent relative movement of the chains away from each other.

KARL BENDER.